United States Patent [19]
White

[11] Patent Number: 4,731,938
[45] Date of Patent: Mar. 22, 1988

[54] ANAEROBIC PASTEURIZING CONDITIONING SYSTEM

[75] Inventor: Richard L. White, Dallas, Tex.

[73] Assignee: Ve Holding Corp., Arlington, Tex.

[21] Appl. No.: 52,759

[22] Filed: May 20, 1987

Related U.S. Application Data

[63] Continuation of Ser. No. 860,105, May 6, 1986, Pat. No. 4,667,418, which is a continuation-in-part of Ser. No. 799,014, Nov. 18, 1985, Pat. No. 4,686,779.

[51] Int. Cl.$^4$ .......................... F26B 3/16; F26B 17/14
[52] U.S. Cl. ............................................ 34/33; 34/173; 426/623; 426/635; 426/807
[58] Field of Search ...................... 34/22, 25, 33, 168, 34/171, 173, 178; 426/623, 635, DIG. 807

[56] References Cited

U.S. PATENT DOCUMENTS

| | | |
|---|---|---|
| 1,035,302 | 8/1912 | Bauer . |
| 1,174,721 | 3/1916 | Henson . |
| 1,185,622 | 6/1916 | Boss . |
| 1,574,210 | 10/1924 | Spaulding . |
| 1,750,839 | 7/1929 | Furbush . |
| 2,647,370 | 1/1950 | Miller . |
| 3,058,235 | 7/1957 | Morris et al. . |
| 3,075,298 | 1/1963 | Schaub .................... 34/173 |
| 3,204,629 | 6/1963 | Newton, Jr. . |
| 3,526,969 | 1/1968 | Alms et al. . |
| 4,024,288 | 5/1977 | Witte . |
| 4,077,841 | 3/1978 | Suprunov et al. .................... 34/173 |
| 4,211,071 | 7/1980 | Wyatt . |
| 4,249,909 | 2/1981 | Comolli . |
| 4,275,708 | 6/1981 | Wood . |
| 4,288,978 | 9/1981 | Wyatt ................................. 60/39.05 |
| 4,520,761 | 6/1985 | Arnold . |
| 4,574,775 | 3/1986 | Lutzen et al. . |
| 4,589,215 | 5/1986 | Iwasaki et al. . |

*Primary Examiner*—Larry I. Schwartz
*Attorney, Agent, or Firm*—Stanley R. Moore

[57] ABSTRACT

An anaerobic, pasteurizing conditioning system for treating matter such as whole and ground grain and minerals to increase the rate of conversion during digestion and thus the nutritional value thereof. The system comprises a direct fired steam generator adapted for producing treatment fluid comprising steam and non-condensible gases, the gases containing insufficient oxygen for substantial aerobic bacterial growth. The steam and oxygen deficient non-condensible gases are discharged into the vessel for counter-current flow relative to matter passing therethrough. The operation of the direct fired steam generator is controlled for producing a sufficiently large volume of oxygen deficient gases and steam for purging the matter of other gases flowing therewith and maintaining the deficient oxygen level in the non-condensible gases for creating an anaerobic condition. In this manner an improved feedstuff is provided wherein the starch components have first been gelatinized in a heated, anaerobic environment and thereafter fractionated to render the feedstuff more digestible.

44 Claims, 11 Drawing Figures

TOTAL DRY MATTER
All Values Dry Basis

| Incubation Hours | Initial Wt. gm | Final Wt. gm | Lost Wt. gm | Percentage Accum | Digestion Period | Hour |
|---|---|---|---|---|---|---|
| TOTAL DRY MATTER – Animal I – Boiler | | | | | | |
| 6 | 15.9010 | 13.0132 | 2.8878 | 18.16 | 18.16 | 3.03 |
| 17 | 15.8830 | 8.3382 | 7.5448 | 47.50 | 29.34 | 2.67 |
| 24 | 15.8859 | 6.7841 | 9.1018 | 57.29 | 9.79 | 1.40 |
| 36 | 15.8785 | 3.7169 | 12.1616 | 76.59 | 19.30 | 1.61 |
| TOTAL DRY MATTER – Animal I – Vaporator | | | | | | |
| 6 | 15.7302 | 12.2730 | 3.4572 | 21.98 | 21.98 | 3.66 |
| 17 | 15.777 | 6.4104 | 9.3673 | 59.37 | 37.39 | 3.40 |
| 24 | 15.7919 | 4.9700 | 10.8219 | 68.53 | 9.16 | 1.31 |
| 36 | 15.7972 | 2.6651 | 13.1321 | 83.13 | 14.60 | 1.22 |
| TOTAL DRY MATTER – Animal II – Boiler | | | | | | |
| 6 | 15.9082 | 10.1297 | 5.7785 | 36.32 | 36.32 | 6.05 |
| 17 | 15.9083 | 3.9706 | 11.9377 | 75.04 | 38.72 | 3.52 |
| 24 | 15.8735 | 2.7764 | 13.0971 | 82.51 | 7.47 | 1.07 |
| 36 | 15.9023 | 2.3770 | 13.5253 | 85.05 | 2.54 | .21 |
| TOTAL DRY MATTER – Animal II – Vaporator | | | | | | |
| 6 | 15.7897 | 9.0871 | 6.7026 | 42.45 | 42.45 | 7.075 |
| 17 | 15.7979 | 2.8171 | 12.9808 | 82.17 | 39.72 | 3.61 |
| 24 | 15.7848 | 1.8100 | 13.9748 | 88.53 | 6.36 | .91 |
| 36 | 15.7824 | 1.5567 | 14.2257 | 90.14 | 1.61 | .13 |

TOTAL PROTEIN

All Values Dry Basis

| Incubation Hours | Initial Wt. gm | Final Wt. gm | Lost Wt. gm | Percentage Accum | Digestion Period | Hour |
|---|---|---|---|---|---|---|
| TOTAL PROTEIN – Animal I – Boiler ||||||||
| 6 | 2.6634 | 1.6266 | 1.0368 | 38.93 | 38.93 | 6.49 |
| 17 | 2.6604 | 1.4541 | 1.2063 | 45.34 | 6.41 | .58 |
| 24 | 2.6608 | 1.3859 | 1.2749 | 47.91 | 2.57 | .37 |
| 36 | 2.6596 | 1.1726 | 1.4870 | 55.91 | 8.00 | .67 |
| TOTAL PROTEIN – Animal I – Vaporator |||||||
| 6 | 2.4144 | 1.5218 | 0.8926 | 36.97 | 36.97 | 6.16 |
| 17 | 2.4187 | 1.1923 | 1.2264 | 50.70 | 13.73 | 1.25 |
| 24 | 2.4208 | 1.1356 | 1.2852 | 53.09 | 2.39 | .34 |
| 36 | 2.4217 | 0.8890 | 1.5327 | 63.29 | 10.20 | .85 |
| TOTAL PROTEIN – Animal II – Boiler |||||||
| 6 | 2.6646 | 1.4586 | 1.2060 | 45.26 | 45.26 | 7.54 |
| 17 | 2.6646 | 1.1518 | 1.5128 | 56.77 | 11.51 | 1.05 |
| 24 | 2.6596 | 0.9078 | 1.7518 | 65.87 | 9.10 | 1.30 |
| 36 | 2.6636 | 0.7587 | 1.9049 | 71.52 | 5.65 | 0.47 |
| TOTAL PROTEIN – Animal II – Vaporator |||||||
| 6 | 2.4205 | 1.2176 | 1.2029 | 49.70 | 49.70 | 8.28 |
| 17 | 2.4218 | 0.7716 | 1.6502 | 68.14 | 18.44 | 1.68 |
| 24 | 2.4198 | 0.5592 | 1.8606 | 76.89 | 8.75 | 1.25 |
| 36 | 2.4194 | 0.3835 | 2.0359 | 84.15 | 7.26 | .60 |

FIG. 6B

STARCH
All Values Dry Basis

| Incubation Hours | Initial Wt. gm | Final Wt. gm | Lost Wt. gm | Percentage Accum | Digestion Period | Hour |
|---|---|---|---|---|---|---|
| STARCH – Animal I – Boiler ||||||||
| 6  | 11.2944 | 8.3778 | 2.9166 | 25.82 | 25.82 | 4.30 |
| 17 | 11.2816 | 4.4942 | 6.7874 | 60.16 | 34.34 | 3.12 |
| 24 | 11.2837 | 1.9578 | 9.3259 | 82.65 | 22.49 | 3.21 |
| 36 | 11.2784 | 1.5718 | 9.7066 | 86.06 | 3.41  | .28  |
| STARCH – Animal I – Vaporator ||||||||
| 6  | 11.0646 | 8.0928 | 2.9718 | 26.86 | 26.86 | 4.48 |
| 17 | 11.0980 | 3.2346 | 7.8634 | 70.85 | 43.99 | 4.00 |
| 24 | 11.1080 | 2.2225 | 8.8855 | 79.99 | 9.14  | 1.31 |
| 36 | 11.1117 | 0.9309 | 10.1808 | 91.62 | 11.63 | .97 |
| STARCH – Animal II – Boiler ||||||||
| 6  | 11.2995 | 6.1213 | 5.1782 | 45.83 | 45.83 | 7.64 |
| 17 | 11.2996 | 1.2729 | 10.0267 | 88.73 | 42.90 | 3.90 |
| 24 | 11.2749 | 0.6530 | 10.6219 | 94.21 | 5.48  | .78 |
| 36 | 11.2954 | 0.8381 | 10.4573 | 92.58 | ⟨1.63⟩ | ⟨.14⟩ |
| STARCH – Animal II – Vaporator ||||||||
| 6  | 11.1064 | 5.7048 | 5.4016 | 48.64 | 48.64 | 8.11 |
| 17 | 11.1122 | 0.8871 | 10.2251 | 92.02 | 43.39 | 3.94 |
| 24 | 11.1030 | -0-    | 11.1030 | 100.00 | 7.98 | 1.14 |
| 36 | 11.1013 | -0-    | 11.1013 | 100.00 | -0-  | -0- |

FIG. 6C

PERCENTAGE STARCH
DIGESTIBILITY

PERCENTAGE DRY MATTER DIGESTABILITY

PERCENTAGE PROTEIN DIGESTION

ANAEROBIC PASTEURIZING CONDITIONING SYSTEM

BACKGROUND OF THE INVENTION

The present application is a continuation of U.S. patent application Ser. No. 860,105 filed May 6, 1986 U.S. Pat. No. 4,667,418 which is a continuation-in-part of U.S. patent application Ser. No. 799,014 filed Nov. 18, 1985 U.S. Pat. No. 4,686,779.

FIELD OF THE INVENTION

The present invention relates to a system for conditioning matter, products of said system and, more particularly, to an anaerobic, pasteurizing conditioning system for treating matter such as ground grain and minerals to increase the rate of conversion during digestion and thus the nutritional value thereof.

HISTORY OF THE PRIOR ART

"Anaerobic" conditioning of matter, as referred to herein, comprises the broad step of exposing matter to a treatment fluid in an oxygen deficient environment. "Pasteurizing", as referred to herein, comprises the step of partial sterilization of a substance through temperature and exposure that kills or retards the growth of certain objectionable organisms, which includes the steps of anaerobic environmental exposure and/or elevated temperature exposure. Finally, "conditioning", as referred to herein, also includes the step of exposing matter to various chemicals which react therewith, the rate of reaction approximately doubling for each 10° C. increase in temperature. These and other terms as defined herein have a direct bearing on the description of the present invention and the problems of the prior art overcome thereby.

The matter addressed herein may be a composition of animal, mineral and/or vegetable products and it may be conditioned for direct use in feed, as well as for pelletizing, flaking, bagging and similar intermediate steps. Unfortunately, few prior art systems have addressed the technological intricacies of matter conversion during digestion and the effects of aerobic and anaerobic bacteria. It should be recognized that food prepared in an aerobic environment cannot be deposited in an anaerobic stomach with the expectation of maximum efficiency in conversion and protein bypass.

Prior art treatment fluids have generally been comprised of steam, gases and/or combinations thereof adapted for heating, cooling, moisturizing or drying and/or combinations thereof. In many instances the treatment fluid simply provides elevated heat to the matter for the high temperature variety of "pasteurizing" and killing certain heat sensitive organisms such as salmonella. Unfortunately, this prior art step can also kill many useful organisms. As stated above, pasteurizing can also be effected by providing an anaerobic environment without the necessity of elevated temperatures. However, prior art systems generally use the treatment fluid heat to also attempt to alter the molecular structure of the matter prior to feeding or processing. In one aspect this is helpful in increasing the lubricity of the matter which is useful in subsequent operations such as compression and extrusion. The elevated "pasteurization" heat from the treatment fluid is therein also a source of energy in lieu of higher electromechanical energies which would otherwise be expended if a subsequent processing operation is required. Moisture generated in the particulate matter or deposited thereon by the treatment fluid then serves as a lubricant. It should be pointed out that the BTU content of conventional steam heat is generally solely a function of the steam volume due to the fact that external combustion boilers are typically used. The only means of transferring heat from steam is thus through its condensation. These considerations have had widespread implications in the conditioning of matter throughout the prior art. Enthalpy levels are critical and when boiler steam is used the only means for adding enthalpy is with the steam. As discussed below for each 20° F. temperature rise, the free and bound moisture level of the particulate matter rises 1 percent. Many problems can develop from high moisture levels including plugging of pelletizing dies when grain and such subsequent operations are involved.

The most important criteria in conditioning whole and ground grain should be, of course, the nutritional value of the matter and thus, the rate at which the matter is converted during digestion. For this reason elevated heat and high moisture levels are not always the most appropriate pasteurizing or conditioning elements. For example "chemical tempering" of the grain will also soften or break down the harder surface of the grain to facilitate digestion. Carbonic acid will attack such grain surfaces and the protein encapsulating the starch, therein making the protein and starch more available for digestion. The availability of such chemical substances in elevated temperatures could thus be seen to be extremely useful because the chemical reaction would be expenentially accelerated with temperature and the nutritional value of the grain and its shelf life further enhanced. Unfortunately, the prior art generally does not address such technological intricacies in grain conditioning.

Examples of the prior art processes and problems set forth above include conditioning systems for cooking and/or the heating and moisturizing of particulate matter, such as grain mainly, prior to pelletizing steps. This is but one illustration, and the prior art is replete with such systems. Many of these processes incorporate horizontal steam conditioning vessels and boiler steam heat exchangers. Usually, the flow volumes and retention times of the particulate matter passage with the boiler steam are considered the most critical operational parameters. Contact is thus made in a random fashion between the particles to be heated and boiler steam within the steam chambers. In the case of commercial grain treatment, steam from boilers is usually vented into the steam vessels through which various types of grain and microingredients are forced to travel. Steam injected into the vessel condenses on the grain therein for heating and moisturizing it to preselect conditions. As stated above, the BTU content of boiler steam is generally solely a function of the steam volume and the only means of transferring heat is through its condensation. Problems have thus arisen in the areas of proper cooking temperature, cooking environment, retention time, oxygen availability, homogeniety in treatment, as well as the steam generation itself. This is also true for the conditioning of particulate matter comprised of animal, mineral and/or vegetable products prior to feeding, bagging, compression, or extrusion processes. Both the immediate food value of the matter and its shelf life are critical to the overall nutritional value of the product.

The prior art of steam vessels for both organic and inorganic material extends into technological antiquity with steam utilized for heating tobacco leaves, grain, flour, vitamins and animal feed for a multiplicity of purposes. As stated above, grain used as animal feed is often treated with steam to improve its digestibility by the animal as well as to improve its food value prior to feeding or pelletizing.

It is known to use steam to heat and/or moisturize particulate matter prior to feeding, bagging, flaking or pelletizing. This is particularly true of ground grain. It is therein heated and the moisture level adjusted to preselected parameters which facilitate the above. Generally, the grain coming to the system is ground, mixed with vitamins and minerals and is relatively dry. The composition often has between eleven and twelve percent moisture at ambient temperatures. Dry and cool mixtures require more energy during the pelletizing phase and energy consumption is, of course, critical to effective operation. The most critical aspect is, however, the nutritional value of the grain.

Conventional steam system conditioning equipment raises the moisture level of the mixture and the temperature of the ground grain composition to the inlet steam temperature. This ostensibly kills dangerous organisms and improves established digestibility characteristics such as starch availability. Other factors, such as the proliferation of aerobic or anaerobic bacteria during conditioning are, however, not usually taken into consideration. This is unfortunate because it is a proven fact that anaerobic bacteria facilitates digestion. The stomach of animals such as bovine, turkey, swine, poultry, lamb and even humans is an anaerobic environment where enzymatic action takes place. Thus, grain which has been anaerobically conditioned is more nutritionally beneficial.

Many prior art grain treatment systems have simply addressed the need for moisture control prior to feeding, bagging, pelletizing, or flaking with apparatus which introduces steam and air in combination. For example, U.S. Pat. No. 1,185,622 to Boss teaches a process for conditioning food forming substances. The Boss patent sets forth the moisture treatment of grain or the like in such a manner that it is hydroscopically conditioned by either adding moisture to, or taking moisture away from such particulate matter. The processes similar to Boss are useful in preparing the grain to a condition where it is uniformly hydrous in its character which is necessary for efficient pelletizing. Such product is more uniformly and efficiently pelletized and ultimately digested in given quantities, in shorter time and with greater nutritive and body building effect. For example, the "microingredients" containing much of the vitamins content cannot be lost during processing. It has thus been a goal in the prior art grain condition technology to provide a treating "fluid" and system therefor capable of delivering or withdrawing moisture or other substances to or from the material to be acted upon for swelling or shrinking or wetting or drying the material as needed. To affect this end result, air and steam have been utilized in various heating and flowing configurations such as that initially shown in the Boss patent. This prior art does not envision heating the grain to a controlled higher temperature or moisture level so as to process it for better pelletizing. More importantly, it does not envision the functional problems of handling the grain efficiently for pelletizing or for bagging, flaking and the shelf life considerations associated therewith.

More advanced prior art grain treatment technology in steaming systems have generally included refinements on the age old principle of simple steam moisturizing prior to processing. For example, U.S. Pat. No. 1,574,210 to Spaulding teaches a method and apparatus for steaming grain and the like. A vertical steam chest is thus taught. The Spaulding steam chest utilizes gravity descent and angularly disposed baffles for deflecting the grain. Steam supply ports are provided for the steaming operation of the grain during its descent.

A prior U.S. patent issued to Henson under U.S. Pat. No. 1,174,721 sets forth an improved method of supplying moisture to grain and the like by utilizing the flow of steam and air heated by said steam prior to entry into a treatment chamber. Air, of course, contains oxygen which allows "aerobic" bacteria to proliferate. This step is not directed toward facilitating anaerobic conversion in an animal's stomach. Moisture is added to the grain by introducing steam with the air prior to entry into the treatment chamber. The Henson patent further teaches the use of a hygrometer to determine the moisture content of the air. Grain which is fed into the interior of sucn an "aerobic" mixing treatment chamber comes in contact with the vapor which tends to condense thereupon. In this manner, the amount of moisture deposited in the substance passing through the treatment chamber may be calculated from the data given. Such a system will also work with raw steam being used instead of the mixture of steam and air. This is not always the case with horizontal steam vessels wherein non-condensible air or gases can create "short circuiting" flow paths above the processed grain to greatly reduce operational efficiency.

Aside from steam chest systems, advancements in conditioning technology has addressed the issue of control of various aspects of the steam itself. These aspects include both the adding of moisture to particulate matter and control of the microingredients mixture therein. Steam therein serves as a source of energy and may act as a binding agent when properly utilized. For example, U.S. Pat. No. 4,024,288 issued to Witte illustrates a method of treating particulate matter for conditioning oil containing vegetable raw materials. In the Witte patent, air and steam are utilized for the treatment of the raw material. Again, an "aerobic" system is taught and since air is a non-condensible in such systems, certain problems may arise. The utilization of super-heated steam coming from a heat exchanger which is then mixed with air is set forth and shown in the Witte reference which also discloses an effective means for immersing the raw material into a steam and hot air bath. Material leaving the bath is then dried by air issuing from a hot air heat exchanger. While effective in heating by means of steam, Witte maintains little control over the temperature to which the raw material is heated and requires two separate fluid streams to attain the desired temperature and moisture levels. This system is not paricularly adapted for addressing the "functional" problems set forth above.

U.S. Pat. No. 4,249,909 issued to Comolli is yet another technological advancement which sets forth a staged process for drying wet carbonaceous material. The staged drying procedure permits wicking of hydrocarbons contained in coal to seal the surface of dried coal products sufficient to prevent appreciable reabsorption of moisture and consequent heating and spontaneous ignition. The Comolli procedure was developed for this particular application and in so doing manifested the advances made in the state of the art in steam treatment systems. These advances may be seen in part in the efforts to define and control various parameters of steam such as partial pressures. The pressures exerted by each constituent alone in the volume of a mixture at the temperature of the mixture are called partial pressures. The partial pressure is directly related to the mole fraction of a constituent present in a mixture and the total pressure thereof. However, to control partial pressure it is necessary to provide an adequate treatment chamber which evenly distributes and conditions the particulate matter passing therethrough. These aspects are set forth above and comprise the critical difference between acceptable and unacceptable conditioning systems.

It may thus be seen that the temperature treatment of particulate matter such as grain usually with steam, has been an area of marked technological evolution through the years. The advantages of steam as a moisturizing and heating medium for animal, mineral and vegetable foodstuffs may likewise be useful if the end product can be selectively controlled. Conventional treatment processes for cellular matter such as grain generally use raw steam as a sole element of a heating medium or in combination with air or similar non-condensible gases for the moisturizing process. As stated above, such processes are typically incapable of effectively treating the grain in the precise manner necessary for maximum effectiveness prior to subsequent use. Specific moisture levels, heat absorption and final grain temperatures must be obtained in a uniform fashion for reliable and effective pelletizing, bagging, flaking or storage.

Reasons for the inability of conventional apparatus to meet such demands of the market are due to their inability to evenly and homogeneously process a given quantity of grain or other particulate compositions whereby each section of matter is treated for an equal time to a select condition with a minimum of energy consumption. Energy consumption is, of course, one critical aspect and the addition of heat or kinetic energy is important relative to operational feasibility. Another equally critical aspect is the nutritional value of the conditioned matter which mandates consideration of the chemical conditioning thereof and the proliferation of various bacteria in the conditioning system. It has been shown, for example, that bacteria which needs oxygen to proliferate ("aerobic" bacteria) is not as conducive to animal digestion as bacteria which does not need oxygen to proliferate ("anaerobic" bacteria). In fact, the inside of a stomach is an anaerobic environment where such bacteria proliferate and enzymatic conversion takes place. Removing only aerobic bacteria in conditioning of food stuff thus benefits the subsequent enzymatic conversion in the digestion process and raise the nutritional value of conditioned matter such as whole and ground grain.

Generally, conditioning requires that the particulate matter be mixed, such as in the blending of various types of grain and feed additives. There are several basic mechanisms by which such particles are mixed. Motions which increase mobility of the particles promote diffusive mixing which can lead to homogeneity. Machines affording such results include tumblers, ribbon mixers, vertical screw mixers, muller mixers, single and twin rotor mixers. Mixing units are thus necessary for homogeneous conditioning of matter when a treatment fluid is utilized. Mixing of grain and treatment fluids such as steam generally occurs in a horizontal mode in prior art configurations. This configuration results in the consumption of great quantities of energy and exposure to air. The problem is due to the weight and resistance of the grain when mixed with conventional steam or the like. Another problem is the homogeneity of the mixture.

It would be an advantage therefor to overcome the problems of the prior art by providing a system for anaerobic, pasteurizing conditioning of matter such as grain by an effective heating medium injected into a processing vessel which uniformly carries compositions therethrough. The system of the present invention affords such an operation by utilizing the steam and products of combustion of a direct fired vapor generator in conjunction with a counter flow conditioning vessel having discharge means disposed therein for uniformly passing particulate matter therethrough in an anaerobic environment. The amount of heat for pasteurization and/or moisture supplied to the matter may therein be controlled by the rate of fuel burning of the vapor generator or by pressurization, while the retention time may be controlled by the time in which the composition is allowed to pass through the vessel. Anaerobic pasteurizing, chemical tempering and overall conditioning can thus be completed with less energy expended and with containment of valuable microingredients and the anaerobic bacteria in the food substance.

SUMMARY OF THE INVENTION

The present invention pertains to anaerobic, pasteurizing conditioning systems incorporating a counterflow processing vessel. More particularly, one aspect of the invention includes an improved conditioning system of the type wherein a vessel is adapted for the flow of matter to be conditioned therethrough and means for injection of a treatment fluid therein. The improvement comprises a direct fired steam generator adapted for producing an anaerobic treatment fluid comprising steam and oxygen deficient non-condensible gases in the products of combustion. Means are provided for introducing the steam and oxygen deficient non-condensible gases from the vapor generator into the vessel for counter-current flow relative to matter passing therethrough. At least one air lock is disposed in the vessel for permitting the egress of matter having passed therethrough while preventing the exhaust of steam and gases therefrom. Means are also provided for controlling the operation of the direct fired steam generator for producing a sufficiently large volume of oxygen deficient gases and steam to purge the matter of other gases flowing therewith. This maintains the deficient oxygen level in the non-condensible gases for creating an anaerobic condition in the vessel which is conducive to subsequent anaerobic conversion.

In another aspect, the direct fired steam generator described above produces carbonic acid for chemical tempering and rendering matter conditioned therein more acidic as well as more readily digestible. This prolongs the shelf life of the conditioned matter, as well as facilitating subsequent conversion and starch availability of the conditioned matter as in the case of animal feed grain. The conditioning vessel may be disposed in a generally horizontal or vertical configuration. Means are provided in either case for the steam and oxygen deficient non-condensible gases from the vapor generator and passing through a diffuser disposed in a region of the vessel for discharging the steam and oxygen deficient non-condensible gases in counter current flow relative to matter passing therethrough. The means for controlling the operation of the direct fired steam generator includes means for determining the oxygen level of non-condensible gases produced by the direct fired steam generator and the means for adjusting the combustion of the generator to produce oxygen deficient non-condensible gases. The oxygen deficient non-condensible gases so produced contain between 2% and 5% oxygen.

In yet another aspect, the invention includes an improved method of conditioning matter exposed to steam within a conditioning vessel. The improvement comprises the steps of providing the steam with a direct fired vapor generator, producing an anaerobic, oxygen deficient environment within the vessel by the introduction of the steam and non-condensible gases therein, providing means for imparting a homogeneous interaction between the matter within the vessel and the steam and gases, providing the steam and gases in sufficient volume and with sufficient enthalpy for purging the system of substantially all other gases and maintaining a temperature therein for anaerobic and/or elevated temperature pasteurization of matter passing therethrough. The direct fired steam generator further produces carbonic acid for rendering the processed matter more digestible as well as more acidic. In one embodiment, the matter is comprised of grain adapted for animal feed and the conditioning renders the grain more readily digestible, more nutritionally valuable and in a condition manifesting a longer shelf life than conventional systems.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a diagrammatic, schematic representation of an anaerobic, pasteurizing conditioning system constructed in accordance with the principles of the present invention;

FIGS. 6A, 6B and 6C are tables of test results on grain conditioned in accordance with the principles of the present invention and by conventional steam conditioning techniques through tests performed in fustulated bovine;

DETAILED DESCRIPTION

Figures 1, 6A:
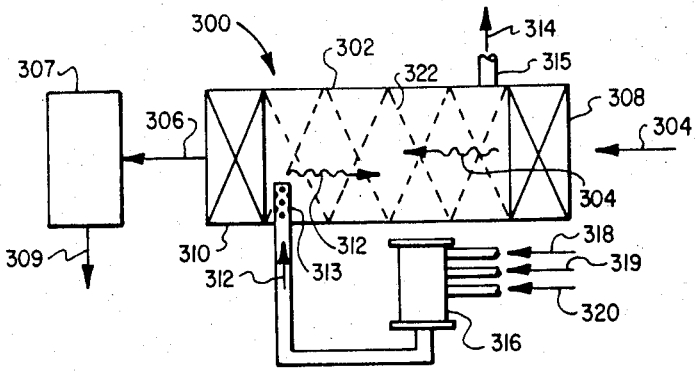

Referring first to FIG. 1, there is shown a diagrammatic, schematic representation of an anaerobic, pasteurizing conditioning system 300 constructed in accordance with the principles of the present invention.

While the numbers in the following description may appear to be in a somewhat unusual sequence, the order will be understood when viewed in light of the parent application, U.S. Ser. No. 799,014, filed Nov. 18, 1986, co-pending herewith, and which is incorporated in its entirety herin by reference as necessary for the present disclosure. FIGS. 2 through 5 included herewith utilize the numerical indexing of the parent application, while the system 300 appears in FIG. 1. With noted exceptions, the system 300 will be substantially identical in construction details to the embodiment shown in FIGS. 2 through 5.

The system 300 in FIG. 1 comprises a vessel 302 adapted for the passage of matter to be conditioned such as grain matter 304 therethrough. The matter 304 egresses as conditioned matter 306 after passing through a sealing airlock system 308 and 310. The airlock systems 308 and 310 maintain the counter-current flow within the vessel 302 between the matter 304 and a treatment fluid 312. The treatment fluid 312 is introduced into the vessel 302 through a diffuser panel 313 and flows in a counter-current manner through the vessel. After engagement with the matter 304 passing through the vessel 302, the remaining gases are released as illustrated by arrow 314 through exhaust vent 315. The matter 304 which is conditioned in an anaerobic, heated environment in accordance with the system 300 of the present invention contains starches, protein and other beneficial nutritional components.

Still referring to FIG. 1, the conditioned matter 306 exiting the system 300 is directed into a mechanical treating system 307 wherein the conditioned matter is subjected to compression. The starch constituents of the conditioned matter are gelatinized by the heated, anaerobic conditioning system 10 of the present invention, and the subsequent compression of the conditioned matter results in mechanical fractionation of the gelatinized starch. The compressed matter issues from the system 307 as feedstuff 309. Thus, the combination of the conditioning of the matter in accordance with the principles of the present invention and the compression of the conditioned matter result in a feedstuff which is more palatable and digestible to the animal. The term "compression" as used herein is to be understood to include the well known processes of pelletizing, flaking and the like.

In accordance with the present invention, a direct fired steam generator 316 is utilized for generation of the treatment fluid 312 for creating an anaerobic pasteurizing conditioning environment within the vessel 302. Air 318 and fuel 319 are combusted to heat water 320, as described in more detail below, to create steam and oxygen deficient non-condensible gases comprising treatment fluid 312. The treatment fluid 312 is forced to flow in a direction counter-current to that of the matter 304 to be conditioned and in a sufficient volume for purging any air carried by said matter 304 out of the vessel 302. Unlike boiler steam and other many prior art systems, the present invention addresses a direct fired combustion which produces high temperature steam products of combustion such as $CO_2$ and carbonic acid, and very little available oxygen. It should be noted that by properly tuning the direct fired vapor generator 316 to afford substantially complete combustion, the excess air necessary for said combustion is minimal and may be on the order of 25% or less. (That is, 5% or less oxygen available in the system). This is presented for purposes of illustration only. Such a low percentage of excess air creates a very low percentage of oxygen in the flue gases introduced into the chamber 302 and thus the "anaerobic" condition. Furthermore, by introducing a sufficiently large volume of treatment fluids 317, i.e., steam and non-condensible gases, relative to the mass of matter 304 travelling therethrough, the oxygen laden air inherently carried by the matter 304 may be purged outwardly therefrom through exhaust vent 315 in the form of discharge gases illustrated by the arrow 314. In order to facilitate the homogeneity of the mass-steam-vapor interaction, mixing means 322 is provided. Mixing means 322 is shown herein in schematic form for purposes of illustration in that a plurality of mixture devices may be utilized as discussed in more detail below. One important aspect of the present invention is not the mixing means but the provision of a conditioning environment wherein direct fired steam is provided for heating, moisturizing and otherwise conditioning the mass contained therein without sufficient oxygen for the growth of aerobic bacteria. The conditioning may include "anaerobic pasteurization", "elevated temperature pasteurization", "chemical tempering" and/or moisture with other nutrients. Such a system particularly enhances the growth of anaerobic bacteria, or that bacteria which grows in an oxygen deficient atmosphere. Other bacteria and organisms which need oxygen to proliferate are either killed or their growth retarded as described and shown in more detail below.

As set forth above, the interaction of the direct fired steam and products of combustion also forms carbonic acid which, with proper mixing with the mass of matter 304, enhances the starch availability of certain matter such as grain used in feeding bovine, turkey, swine, poultry, lamb and even humans. This is accomplished by chemical tempering with the carbonic acid which breaks down the harder surfaces of the grain. Encapsulated starch is thus released and digestibility enhanced. When the conditioning temperature is raised the rate of chemical tempering increases and approximately doubles for every 10° C. increase. Moreover, the enthalpy of the treatment fluid is not limited solely to the BTU value of the steam, because approximately 35% of the heat value can come from the non-condensible gases produced by the generator 316. This is unlike boiler steam where for every 20° F. temperature increase, the free and bound moisture level rises one percent. When the temperature of the grain containing 12% incoming bound moisture raised 130° F. by boiler steam, the moisture level of the grain thus rises to 18.5%. This additional moisture can plug a pellet die. Thus, it is critical to be able to add enthalpy to the system without adding moisture to the grain which requires adding heat with the non-condensible gases discussed above. In this manner, the system of the present invention can provide selection of a dew point and temperature independently.

The capacity to select, or dial-a-dew point, independent of the enthalpy in the present system means that the rate of chemical tempering and ultimate matter temperature can be controlled without affecting the volume of steam and the moisture level of the grain. Select moisture levels are of course, important to the proper generation of carbonic acid. Carbonic acid renders the conditioned matter more acidic, which extends its shelf life. This diagrammatic illustration of the process is set forth for purposes of emphasizing the basic elements of the present invention relative to the various structural system technology previously set forth by applicant in co-pending applications Ser. Nos. 771,337, 799,014 and 589,260 assigned to the assignee of the present invention. By controlling the products of combustion and tuning the direct fired vapor generator for producing carbonic acid, a minimum amount of oxygen, and select quantities of steam, the nutritional value and shelf life of grain can be greatly enhanced which is a marked advance over prior art systems.

Figure 2:
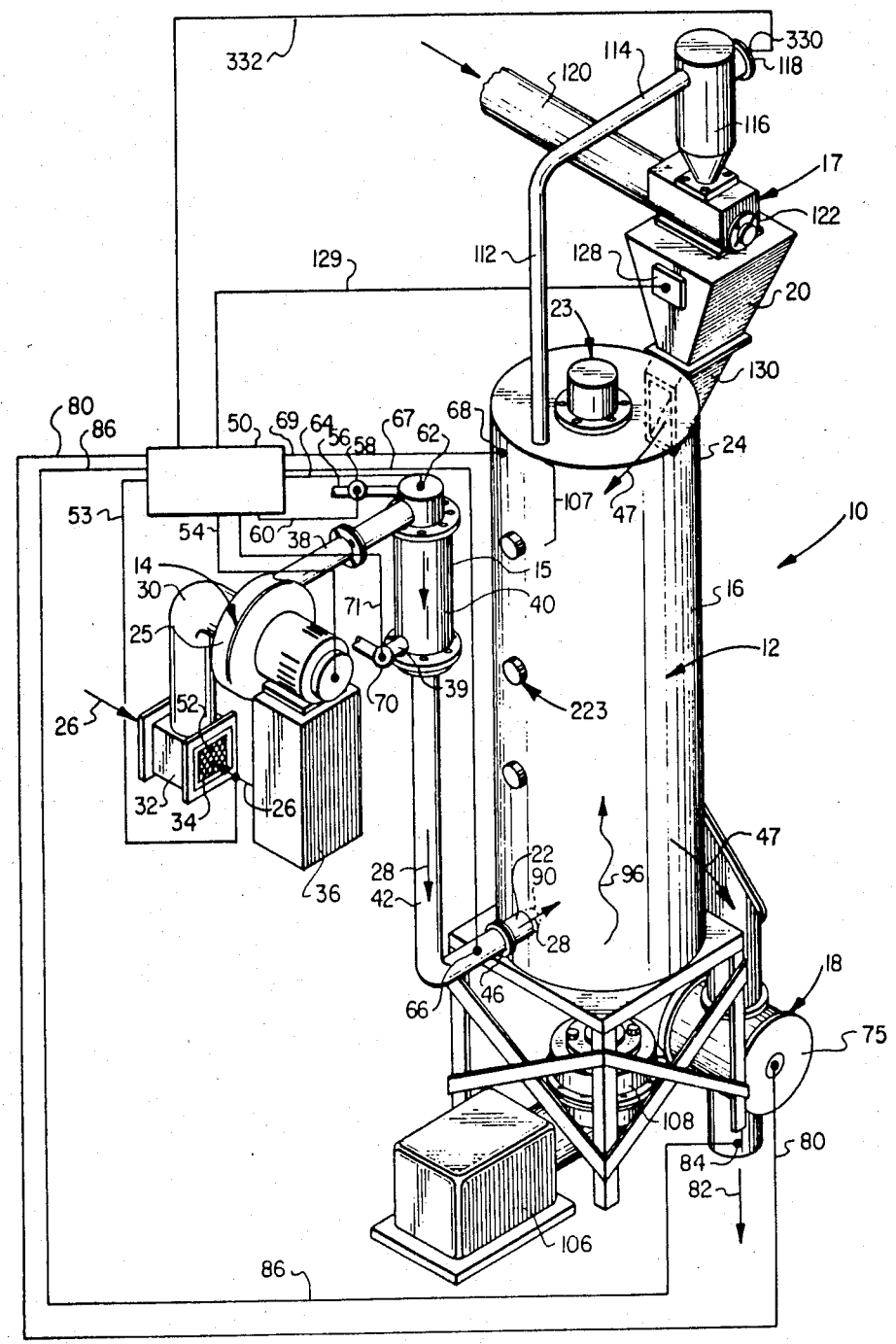
FIG. 2 is a diagrammatic, perspective view of one embodiment of the method and apparatus of the present invention illustrating the conditioning of particulate matter in a generally vertical vessel in which is injected a treatment fluid.

Referring now to FIG. 2, there is shown one embodiment of a particulate matter conditioning system 10 constructed in accordance with the principles of the present invention. Although matter of animal, mineral or vegetable variety may be processed, the term "particulate matter" is used herein to designate discrete particles of any mass subjected to anaerobic, pasteurizing, conditioning. The system 10 of FIG. 2 is shown to comprise a vertical treatment vessel 12 and treatment fluid generation unit 14. As set forth above, the treatment fluid of the present invention is direct fired steam and the products of combustion. The unit 14 as shown herein comprises a direct fired vapor generator for producing the aforesaid combination, to wit: steam and non-condensible gases. Vapor generators include vessels wherein fuel and oxidant are burned to heat water added thereto so that steam and non-condensible gases are discharged. In the present invention, steam and carbonic acid are produced with the non-condensible gases that contain relatively small quantities of oxygen.

The process vessel 12 of FIG. 2 includes a cylindrical chamber 16, upper airlock-feed system 17, and lower airlock discharge unit 18. Particulate matter such as grain, passes from an upper surge bin 20 coupled to the chamber 16 for providing continuous matter flow. The particulate matter is exposed to vapor discharge therein through conduit 22 positioned along side wall 24 of the chamber 16. A rotor, or paddle system 23 is incorporated with a stator system 223 to establish a plurality of notional mixing planes, of the oxygen deficient vapor and the particulate matter. This eliminates defined steam or gas channels and maintains homogeneity of the grain, steam, and non-condensible gas mixture. With the system shown herein select heating and liquid constituent control of particulate matter such as grain may be provided.

Still referring to FIG. 2, unit 14 as shown herein comprises a direct fired, vapor generator unit 15 and blower 25. The vapor generator 15 provides a myriad of advantages as discussed below. Input to the vapor generator 15 is supplied by the blower or compressor 25 wherein intake air 26 is heated in the generator 15 and mixed with steam and non-condensibles generated thereby. The unit 14 discharges a hot-gas stream 28 through conduit 22. The air 26 is drawn into the compressor 25 through filter screen 34 covering intake manifold 32 and vectored through intake pipe 30. The blower 25 is mounted upon a support chassis 36 (diagrammatically shown) which may also support the related elements of the steam generation unit 14. The blower 25 is then coupled to the vapor generator 15 through an air discharge conduit 38. Air entering the vapor generator 15 supplies the oxidant for combustion occurring therein, which combustion produces heat for raising the temperature of water supplied therein above the vaporization phase in the production of steam. The water supply conduit 39 is thus shown coupled to the body 40 of the vapor generator 15. The water is vaporized by said combustion and discharged through exhaust conduit 42 upstream of discharge conduit 22 coupled thereto by coupling flange 46.

The operation of the vapor generator 15 as shown in FIG. 2, is tuned to produce a minimum amount of $O_2$ with the products of combustion. This may occur with or without a stoichiometric mixture. In fact, excess air is generally needed to drive combustion to completion. With complete combustion and minimal excess air (around 25%) the availability of $O_2$ in the exhaust is less than 5%. This is both empirically correct and provable by experimentation. 5% or less $O_2$ in such an environment will not sustain aerobic bacterial growth and is referred to herein as an anaerobic condition. Exposing aerobic bacteria to such an environment will, of course, kill or retard the growth of said aerobic bacteria, herein referred to as "anaerobic pasteurization". Thus, as the mixture of steam and non-condensibles passes through the chamber 16, particulate matter such as grain 47 and microingredients loaded through the surge bin 20 and upper region thereof are effectively heated and pasteurized anaerobically and/or pasteurized by elevated temperature while being moisturized and treated with carbonic acid for improving the food value thereof. This is all done in an environment where only anaerobic bacteria can proliferate and the rate of chemical tempering with carbonic acid can be accelerated. As stated above, it has been shown that anaerobic bacteria facilitate digestion in animals, because an animal's stomach is an anaerobic environment. The present invention thus vastly improves the nutritional value of the grain, as well as the shelf life thereof through the carbonic acid produced by direct fired steam.

Referring still to FIG. 2, a control unit 50 is provided for integrating temperature readings of the various processing fluids as well as the particulate matter 47 and controlling the operation of the system 10 in accordance with the principles of the present invention. Temperature sensor 52 is thus disposed in the air intake manifold 32 and coupled to control unit 50 by sensor line 53. Likewise operation of the blower or compressor 25 is controlled by control line 54 coupled to the control unit 50. Fuel is provided to the vapor generator 15 by fuel line 56 proportioned by control device 58 coupled to control unit 50 by control line 60. Performance parameters of the vapor generator 15 are monitored by sensor array 62 coupled to control unit 50 by control line 64. Temperature discharge medium 28 (hot gas stream) is monitored by sensor 66 disposed in conduit 42 and coupled to control unit 50 by sensor line 67. Temperature of the particulate matter such as grain 47 is likewise monitored by sensor 68 coupled to control unit 50 by sensor line 69. Water flowing through conduit 39 to vapor generator 15 is regulated by valve 70 which is controllable by control unit 50 and coupled thereto by control line 71. Grain 47 passing through chamber 16 is therefore exposed to the hot gas stream 38, i.e. steam and non-condensible gases which have been produced by selectively controllable parameters in the upstream vapor generation unit 14 and percolate upwardly within the vessel 16 as treatment fluid 96. The length of time of travel of the grain 47 through a series of notional mixing planes within chamber 16 is therefore selectively controllable through actuation of the airlock discharge system 18. The airlock discharge system 18 of this particular embodiment is comprised of a rotating gate valve system 75 which is coupled to the control unit 50 through control line 80. Both the control and illustration of the airlock discharge system 18 of FIG. 2 is presented for purpose of illustration only. A garner system or the like as set forth in copending patent application Ser. No. 766,640, filed Aug. 15, 1985 and assigned to the assignee of the present invention may also be used herewith. The temperature of the discharged grain 82 may be monitored by a sensor 84 positioned beneath the airlock discharge unit 18 which is coupled to the control unit 50 by sensor line 86. Finally, the levels of $O_2$ and fuel can be monitored at sensor 330 coupled to control unit 50 by line 332. The control unit 50 can be equipped with conventional constituent level measurement equipment for regulating the anaerobic conditioning described herein. In this manner, the control unit 50 may be used to monitor and control the operation of system 10 in accordance with the principles of the present invention.

Figure 3:
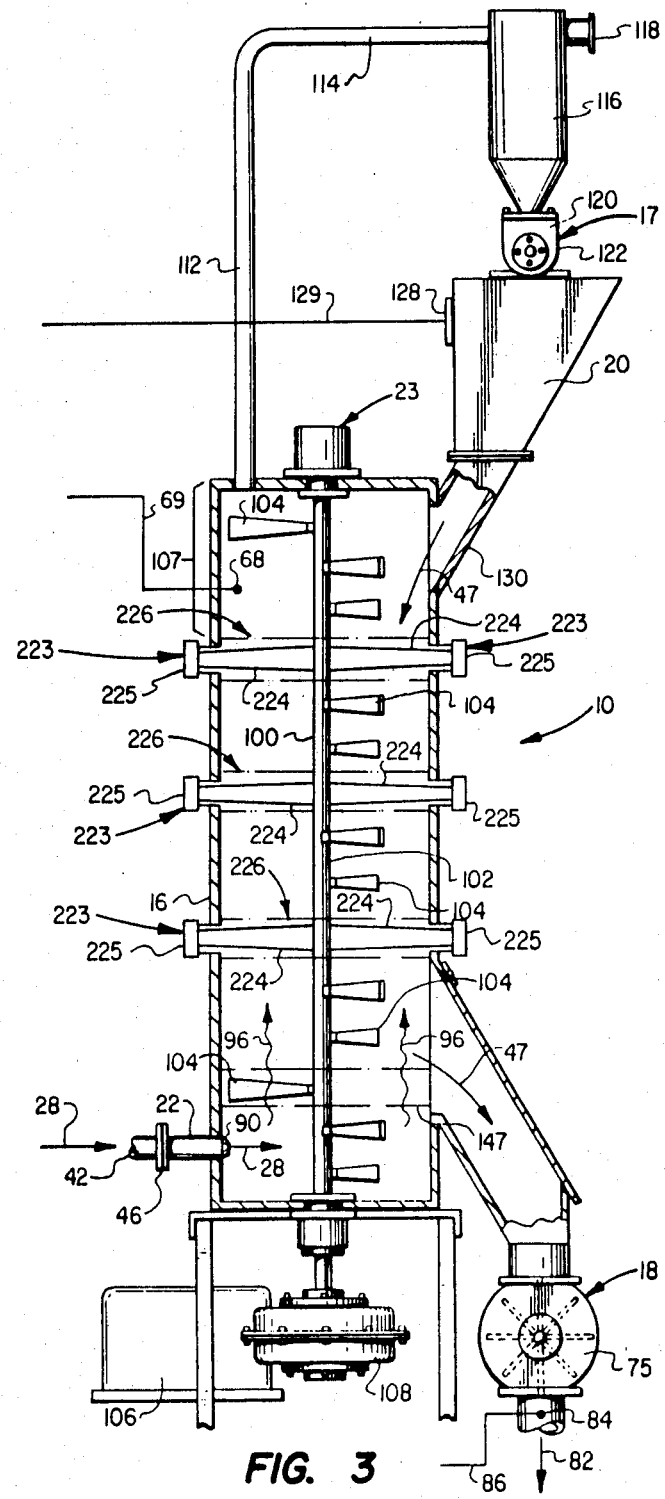
FIG. 3 is a side-elevational, cross-sectional view of the vessel of FIG. 2.

Referring now to FIG. 3 there is shown an enlarged, side-elevational, cross-sectional view of one embodiment of a vertical, particulate matter treatment chamber 16 of the particulate matter conditioning system 10 constructed in accordance with the principles of the present invention. It should be noted that the particular embodiment of the treatment vessel 16 shown herein is but one embodiment of said chamber and the method and apparatus of the present invention. Both horizontal and vertical systems can be used. The paddle system 23 is constructed of a paddle shaft assembly 100 comprising a central shaft 102 and a plurality of paddles 104 mounted there upon. The paddles 104 are staggered both longitudinally and rotationally one to the other and are constructed with a preselect pitch. The lower paddles 104 swirl and propel particulate matter in an upward direction while an upper paddle propels vapor and matter downwardly. Rotation of the paddles 104 is provided by a motor 106 coupled to a gear box 108 disposed immediately below the shaft 102 for rotation thereof at preselect speeds. In this manner, particulate matter such as grain 47 descending through the vessel 16 may be fluffed and propelled upwardly along various notional mixing planes 147 defining the regions of rotation of the paddles 104 whereby ascending treatment fluid such as steam and non-condensible gases 96 is thoroughly and homogeneously mixed therewith. It should be noted that by providing sufficient steam and non-condensible gas volume, the air carried in by the grain will be purged from the system 10 by the countercurrent flow. This step is necessary to reduce the $O_2$ level for anaerobic conditioning and thus the airlock system is used.

Still referring to FIG. 3, the vessel 16 is further constructed with a stator system 223 comprising a plurality of stators 224 disposed between certain ones of said paddles longitudinally therealong. Each stator 224 is secured to the side-wall of the vessel 16 by securement caps or bulkheads 225. Stators 224 are disposed diametrically opposite one another within the vessel 16 to define a notional stator, or "counter-swirl" plane 226. The notional stator planes 226 are disposed longitudinally along the vessel 16 between arrays of said paddles as shown in the drawing. In this manner, the rotation and propelling of particulate matter by the paddle system 23 is divided into segments to prevent a continuous pattern of swirling particulate matter through the vessel 16. Such a condition can produce "predefined vapor paths" therethrough. This term is used to describe the condition wherein the vapor "finds" a low resistance flow path. Without stators 224 this "predefined path" is usually in the center region of the vessel 16 due to the outwardly swirling matter. This condition results in the vapor not being uniformly mixed with the particulate matter. Pockets of air and $O_2$ could otherwise form to prevent anaerobic conditioning. The stators 224 in essence create the "counter-swirl" notional plane 226 blocking both the movement of particulate matter between discrete paddle sections propelling matter back to the center of the vessel and further inhibiting defined vapor flow paths upwardly therethrough.

In accordance with the principles of the present invention the ascending flow of vapor then homogeneously interacts with the particulate matter which the stators 224 effectively accomplish. The absence of the stators 224 can, under certain circumstances and conditions, permit vortexual swirling of the particulate matter induced by the paddle system 23. When this occurs, vapor can channel upwardly throughout the vessel 16, attributing to non-homogeneous, aerobic interaction and inefficient conditioning as outlined above. The positioning of the stators 224 further facilitate discrete segmentizing of the fluffing and propelling of the particulate matter upwardly across the various notional mixing planes 147 defined above. The regions of rotations of the paddles 104 are thus provided in sufficiently small axial sections to maximize the inhibiting of vapor channeling between notional planes 226.

For purposes of example only, it should be noted that the vessel 16 may be constructed of stainless steel, or the like. In one such construction the paddle assembly 100 has been formed of fifteen separate paddle members 104, although the exact number is not controlling. In this construction of the system 10, the paddle members 104 were constructed in 24 inch lengths set at a 30° pitch for fluffing the grain upwardly. As further recited herein, the uppermost paddle 104 is preferably set with a downwardly directed pitch for forcing the particulate matter in a downward direction. As shown in the drawings, the paddles 104 are angularly offset one from the other which, in one embodiment, included a 120° offset. In this configuration a grain mash was prepared for pelletizing with the paddle system 100 installed in a vessel 16 constructed of a 10 foot height. The paddle system 100 was operated at a speed of 200 rpm and a steam pressure of 1.5 psi.

Still referring to FIG. 3, treatment fluid such as steam and non-condensible gases is injected into the chamber 16 through the conduit 22 and dispersed therein by one or more steam nozzles 90 installed in the side walls of the chamber 16. Steam nozzles 90 are but one example of steam injection means and any of a variety of steam injection manifolds or systems may be utilized. The utilization of the paddle system 100 and the fluffing action along notional or mixing planes 147 as illustrated herein facilitates the homogeneous mixture of the steam and particulate matter. The terms notional and mixing in characterizing the planes 147 are interchangeable, and in certain instances hereinafter the planes 147 will be termed notional planes and in other instances mixing planes. As stated above, the matter may be of an animal, mineral or vegetable variety. The term "particulate" likewise refers to any of a variety of sizes including dust, microscopic particles as well as pellets, rocks and the like. This wide latitude of matter composition and size is feasible due to the vertical orientation of vessel 16 with paddle system 100 establishing a plurality of homogeneous mixing planes therein. Therefore the precise infusion of steam into the vessel 16 is not as critical as in many prior art configurations. Steam rising from nozzle 90 engages the lower most rotating paddle 104 and notional mixing plane 147 thereof to become evenly dispersed therearound. The resulting rising steam 96 continues to penetrate the numerous notional planes 147 of paddle rotation and notional planes 226 of stators 224 for homogeneous interaction with the descending particulate matter 47 in a uniform condition or pattern. Pressures and temperatures will, of course, vary with each notional mixing plane 147 depending on its vertical position within vessel 16. The pattern can be selected for particular components such as grain, microingredient and dust configurations. Moreover, the percolation of the oxygen deficient, non-condensible gases from the vapor generator 14 (as shown in FIG. 2) upwardly through the notional planes 147 and 226 produce a medium of low resistance to rotation of the paddles 104, as the non-condensible gases displace the heavier grain 47. The presence of non-condensible gases in the treatment fluid thus reduces energy consumption which increases unit efficiency. Heat from the treatment fluid is thus added more homogeneously in the mixing planes 147 to further reduce energy consumption. Due to the construction of the airlock and discharge system 18 and the paddle system 100, ground grain, microingredients and the like passing therethrough are uniformly distributed and are not subject to agglomeration and channeling as is so prevalent in prior art steam moisturizing chambers of either vertical or horizontal configurations. The method of flow diversion and steam handling through the airlocks herein controls and effectively maximizes energy consumption relative to grain heating. Heat for pasteurization can thus be added to the particulate matter in the vessel 16 prior to subsequent pelletizing wherein energy consumption costs are much higher. As stated above, heat is an additional source of energy in lieu of added electrical horsepower and can increase lubricity of the particulate matter. This is a critical step in grain conditioning because the subsequent step of pelletizing is much more efficient if the pelletized die is lubricated by moisture in the grain. Tonnage rates can drop by over 50% if the grain is not properly conditioned. Likewise, too much moisture can cause equally severe problems and thus the present invention provides means for establishing both temperature and/or moisture levels in the particulate matter prior to pelletizing.

Referring still to FIG. 3, the air and discharge system 18 is illustrated wherein discharge valve 75 is provided for actuation and elimination of heated and moisturized grain uniformly from the vessel 16. As stated above, a single or multiple garner system may likewise may be utilized as set forth in co-pending patent application Ser. No. 766,640. In either manner, the bulk of the steam and non-condensible gases 96 are forced to uniformly rise within the chamber 16 for exposure to an homogenous interaction with the particulate matter, dust and microingredients passing therethrough prior to compression and extrusion operations such as pelletizing. The propelling of microingredients and dust upwardly with the steam and non-condensible gases 96 as shown herein further enhances the interaction and mixture thereof in the moisturization step. When conditioning ground grain, the microingredients and grain dust are urged to agglomerate prior to passage through discharge unit 18. Dust and/or microingredients which reach the upper most level of the chamber 16 in the upper vicinity 107 engages the upper most paddle 104 which is preferably constructed with a downwardly directed pitch for propelling the fine dust particles and microingredients downwardly into the mixture of particles 47 passing thereunder. The utilization of a downwardly deflecting uppermost paddle 104 has been shown to be abundantly useful in containing microingredients of ground grain and microingredients in prepelletizing mixtures due to the fine consistency thereof. It should be noted that the value of the pelletized mixture is contingent to a large part on the homogeneous inclusion of said microingredients due to their high vitamin content and the tendency thereof to be eliminated during many prior art steam and moisturizing processes. However, to further insure the containment of all microingredients and grain dust particles, other support systems described below are utilized herewith.

Figures 4, 5:
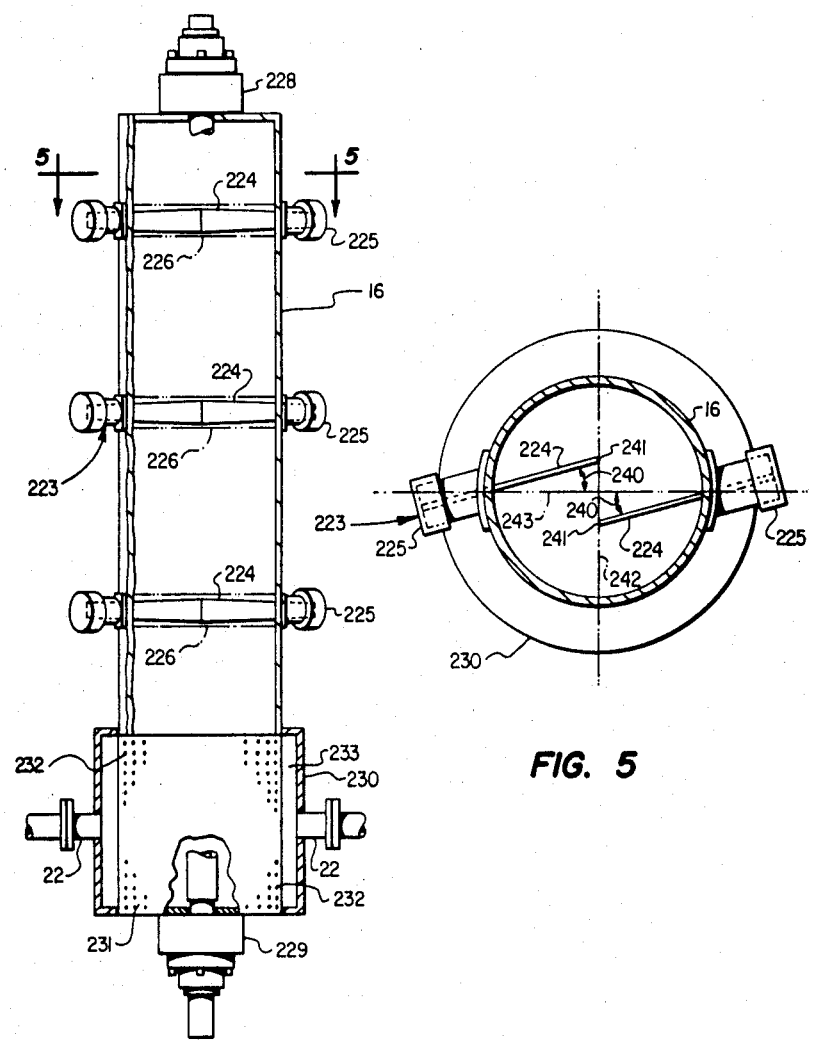
FIG. 4 is a side-elevational, cross-sectional view of an alternative, embodiment of the vertical conditioning vessel of FIG. 2 constructed with a plurality of stators disposed therein and a vapor diffuser disposed therearound.
FIG. 5 is a top plan, cross-sectional view of the vessel of FIG. 4 taken along lines 5—5 thereof illustrating the placement of the stators therein.

Referring now to FIG. 4 there is shown a diagrammatic, side-elevational, cross-sectional view of the vessel 16 and stator array 223 of the present invention. The paddle array 23 has been removed to more clearly illustrate the alignment and mounting of the individual stators 224. It may be seen that the stators 224 are secured to the outer walls in the vessel 16 by mounting bulk heads or caps 225. The caps 225 may be welded pipe sections with threadably mounted ends to facilitate assembly. The mounting bulk heads 225 allow each stator to be secured within the vessel 16 in generally parallel spaced relationship along notional plane 226. In this particular embodiment a perforated diffuser plate 231 is also shown in the lower region thereof. In this alternative embodiment of a method and apparatus for infusing vapor into the chamber 16, an outer cowling 230 is provided in flow communication with conduits 22 as shown in FIG. 2. The outer cowling 230 provides an annular region 233 for vapor to fill and evenly ingress into vessel 16 through the perforated diffuser plate 231. Diffuser plate 231 may be cylindrical and preferably contains a plurality of apertures 232 for allowing equal flow of vapor from region 223 into vessel 16 and engagement with particulate matter therein. In this particular embodiment the structural configuration for both the conduits 22, flow cowling 230 and shaft mounting members are illustratively shown. Upper shaft mounting section 228 and lower paddle shaft mounting section 229 are seen in concentric alignment relative to the vessel 16 for supporting the rotational motion of the centralized paddle array.

Referring now to FIG. 5 there is shown a top plan, cross-sectional view of the vessel 16 of FIG. 4 taken along lines 5—5 thereof. Stators 224 are shown to be secured outwardly of the vessel wall 16 by the fastener bulk head 225. As stated above, one method of mounting the stator 224 is to provide a threaded pipe and head to which the stator 224 is secured by welding, or the like. In this manner, the stator 224 and the fastener bulk head 225 can be unscrewed from the pipe section and removed from the vessel 16. This allows the paddle system to be lifted out of the vessel 16 for repair or installation.

Still referring to FIG. 5, each stator 224 is aligned in generally parallel spaced relationship with the stator disposed on the opposite side of the vessel 16 to establish a notional mixing plane 226 thereacross. For purposes of establishing said notional plane 226 (FIG. 3), each stator 224 is mounted at an angle 240 relative to a diameter line passing through the caps 225 and vessel 16. The stator 224 is of a length terminating along diameter line 242, which line 242 is generally orthogonal to diameter line 243 from which angles 240 subtend. As may further be seen in this top plan view, the flow diffuser cowling 230 is disposed beneath the stators 224 in further illustration and construction thereof. It is to be understood that this is but one embodiment of a construction of a flow diffusing wall 231.

The utilization of stators 224 as described herein provides a very distinct advance over systems not incorporating said stators by segregating the notional planes 147 as shown in FIG. 2. These stators 224 block the swirling flow of particulate matter relative to the rotating paddles 104 above and below said stators. When the matter is blocked, it is propelled back toward the center of the vessel 16 due to the angle 240 of the stator. An angle on the order of 30° has been found operable and effective in counter-swirling the matter above and below the stator and in preventing channeling of vapor therethrough. It should also be noted that the stator 224 can be placed between any number of paddles 104 comprising an array although only two paddles are shown in FIG. 2 between each stator.

The present invention utilizes a direct fired vapor generator of the type wherein steam and oxygen deficient non-condensible gases are fed into the vessel 16. These gases facilitate paddle rotation, homogeniety in the notional planes 147 and an anaerobic conditioning environment. However, such a system requires the discharge of the non-condensible gases and the air purged from the grain as shown in FIGS. 2 and 3. A separator line is thus provided for collection of said purged air and flue gases and the concomitant collection of valuable dust latent particles therein. These particles rising with the non-condensible gases which pass the upper deflector paddle 104 are collected in the separator line 112 which is secured in flow communication to the uppermost region 107 of the vessel 16. The opposite end 114 of separator line 112 is coupled in flow communication to a vortex separator unit 116, or the like, which effectively separates particles from the gas vapor flowing therethrough. The vortex separator 116 is of a established prior art design commonly utilized in the grain industry at various process stages thereof. The conventional vortex separator incorporates a high speed cylinder in engagement with the gaseous infusion from separator line 112 whereby particles are centrifugally contained and vectored downwardly into the grain processing system while "scrubbed" vapor is allowed to be discharged through vent 118. In the present invention, the vortex separator 116 is showed and mounted on top of an inlet feed screw 120, which is in sealed communication with the airlock system 122. The feed airlock system 122 as shown herein is particularly adapted for receipt of grain fed from storage bins (not shown). The grain, microingredients and dust are thus passed through airlock 122 into upper surge bin 20. The surge bin 20 is formed in a tapered configuration to facilitate flow while containing preselect levels of particulate matter such as grain 47 necessary for continuous operation and processing in the vessel 16. A bindicator 128 is mounted to the surge bin 20 providing means for indicating grain level. The bindicator 128 is likewise coupled to the control unit 50 by control line 129 as shown in FIG 2. Infusion of grain 47 into the surge bins 20 is, thus controlled by a response to the bindicator 128 through control system 50. Utilization of bindicators 128 and surge bins 20 is, in and of itself, conventional in the prior art. However, in the present invention the surge bin 20 further comprises a necked area 130 in the vicinity of the upper region 107 of the vessel 16. The necked region 130 provides a choke feed for the descending flow of grain 47 as well as the ascending flow of steam and non-condensible gases 96. In this manner, the steam and non-condensible gases 96 are forced to remain within the vessel 16 unless exhausted through separator line 112.

Referring now to FIGS. 1 through 5, in combination, it may be seen that the assembly of the present invention utilizes a system capable of anaerobic, pasteurizing, conditioning of any matter present within the vessels 300 (FIG. 1), and 16. This control is effected by the generation of oxygen deficient flue gases in a direct fired vapor generator and homogeneous mixing of the steam, gases and particles through the plurality of notional or mixing planes 147 and 226 described above and through the control of enthalpy, partial pressure and dew point in the vessel 16. The control of enthalpy, partial pressure and dew point within vessel 16 is most clearly set forth and described in co-pending application Ser. No. 589,260, filed Mar. 13, 1984, now U.S. Pat. No. 4,704,804 assigned to the assignee of the present invention and incorporated herein by reference. By providing a closed system such as that shown herein with upper and lower airlocks and means for homogeneous particulate and treatment fluid flow therethrough said parameters may be controlled for maximizing the efficiency in particle conditioning. With a vapor generator 14, the rate of heating is also controlled by the rate of fuel burning while the moisture content and maximum temperature generated in the particulate matter can be controlled through the partial pressure of the condensible vapor and dew point within the vessel 16. The utilization of the rotating paddles 104, stators 224 and mixing planes 147 and 226 facilitate preselect homogeniety and uniform distribution of, enthalpy partial pressure and dew point therein. As stated above, these parameters vary along the vertical height of the vessel 16 and throughout the counter-current course of flow. The partial pressure and dew point are, in turn, determined by the fluid flow rates in the vapor generator and/or the introduction of extra amounts of non-condensible gas and the total pressure at which the system 300 (FIG. 1) and 10 (FIGS. 2–5) operates. By utilizing the airlock feed and discharge system of the present invention and the feedback separator line 112, the overall system 10 may be pressurized for variations in altitude, temperature and product processing requirements. In operation the vessel 16 and the system 10 of the present invention have been found to be effective in reducing energy consumption in the processing of particulate matter such as gain and increasing the nutritional value of the grain. The present system 10, utilizing both swirling and counter-swirling notional planes 147 and 226, respectively, disposed longitudinally along the vertical vessel 16 and created by the array of paddles and stators disposed therein, has substantially reduced the amount of energy required for temperature and moisturizing conditioning of mash, a ground up grain mixture utilized for animal feed. In one test of the method and apparatus as described herein, 808,000 BTU's per hour were utilized for a mass flow rate of 11.56 tons per hour. The resultant energy consumption was established to be approximately 70,000 BTU's per ton of mash. This is a significant reduction over conventional processing consumption rates. Moreover, the grain mixture had a much higher nutritional value. Conventional processing consumption rates on the order of 210,000 BTU's per ton of mash are common for "apparent" equivalent moisture and temperature conditioning treatment. The term "apparent" is used because conventional equipment does not provide the anaerobic, pasteurizing conditioning set forth herein. For this reason it may be seen that the utilization of the method and apparatus of the present invention affords a great advantage over the prior art and greatly enhances total savings. It will be noted that the counter-swirl mixing planes provided by the stators 224 disposed between the rotating paddles 104 greatly facilitate the homogenous interaction of the temperature and moisture treatment fluid ascending through the vessel 16. As described above, the paddle and stator configuration prevents the undesirable confined channeling of the treatment fluid vapor through low pressure regions which would ordinarily be created in many prior art configurations. When vapor is allowed to channel upwardly without homogenous interaction with the particulate matter, air trapped in the matter cannot be purged out for anaerobic conditioning. Moreover, a great deal of energy will be lost and more processing time will be necessary for uniform treatment of the particulate matter. The present invention overcomes these problems of the prior art as herein described and therein provides a marked advantage for treatment of animal, mineral and/or vegetable matter in a counter-current flow configuration.

The conditioning system of the present invention utilizes the controlled heat, combustion products and homogenous mixing characteristics as described to effectuate anaerobic and/or elevated heat pasteurization to kill or retard the growth of undesirable bacteria as well as providing heretofore unrecognized conditioning advantages. The rate of such conditioning can also be varied to maximize starch availability in grain compositions or to render the grain more acidic to prolong its shelf life. Since the value of the grain depends on its ability to be stored and to nourish animals fed therewith, the aspect of shelf life, starch availability and other nutritional characteristics such as proliferation of anaerobic bacterial growth are critical considerations. It has been shown by experimentation and in vitro studies that grain conditioned in accordance with the principles of the present invention and heated by direct fired steam in an anaerobic environment is more readily digestible by ruminant animals and more efficiently converted to weight in said animals. This is because such conditioning is consistent with the type of chemical reaction occurring in an animal's stomach. In the case of bovine, the feed is converted to energy maintenance and growth in the first stomach, allowing the remainder of the unconverted protein and starch to pass to the second stomach. As more specifically set forth above, a sufficient volume of direct fired steam and non-condensible gases is necessary for adequately purging the mass flow of air carried therewith. For this reason as well as the necessity for homogeneous mixture between the matter to be heated and the steam, a counter-flow environment is provided in conjunction with an appropriate air lock system for sealing the system. Without such an airlock device as shown herein, the steam and non-condensible gases would not be forced to flow against the movement of the matter and pockets of air could be created for permitting the proliferation of aerobic bacterial growth. Likewise, proper conditioning of matter such as grain necessitates a homogeneous treatment whereby each particle of matter is exposed to substantially the same temperature, moisture level, chemical substances, kinetic energy, and anaerobic environment for the desired conditioning. The conditioning parameters are not established for individual particles but for the overall system and non-uniformity in treatment can negate the usefulness of the system as a whole. For this reason at least one embodiment of mixing means is shown for promoting homogeneous interaction which in the present embodiment includes a generally vertical vessel having a plurality of paddles disposed therein. As stated above, a horizontal system can be equally efficient in providing the anaerobic pasteurizing conditioning of matter although other flow considerations must be considered.

Referring now to FIGS. 6A, 6B and 6C there are shown tables of data on grain conditioned in accordance with the present invention and by conventional boiler steam processes. The grain which was employed in the tests was milo. One feedstuff was prepared in accordance with procedures of the prior art and subsequently flaked, and the other feedstuff was conditioned using the anaerobic system of the present invention and thereafter subjected to flaking. This compression step insured that the gelatinized starch in the milo resulting from conditioning in the anaerobic, heated environment of the present invention was fractionated to improve the digestibility. The data was generated from test performed in fustulated bovine by an independent research laboratory in Mexico. The bovine were of the same sex and had common water, rest and eating habits. Each animal was tested with both types of conditioned grain simultaneously for control purposes. The data and the charts of FIGS. 6–9 illustrate the differences in nutritional value and rates of conversion resulting from the differences in grain conditioned by the prior art and by the system of the present invention.

Figure 7:
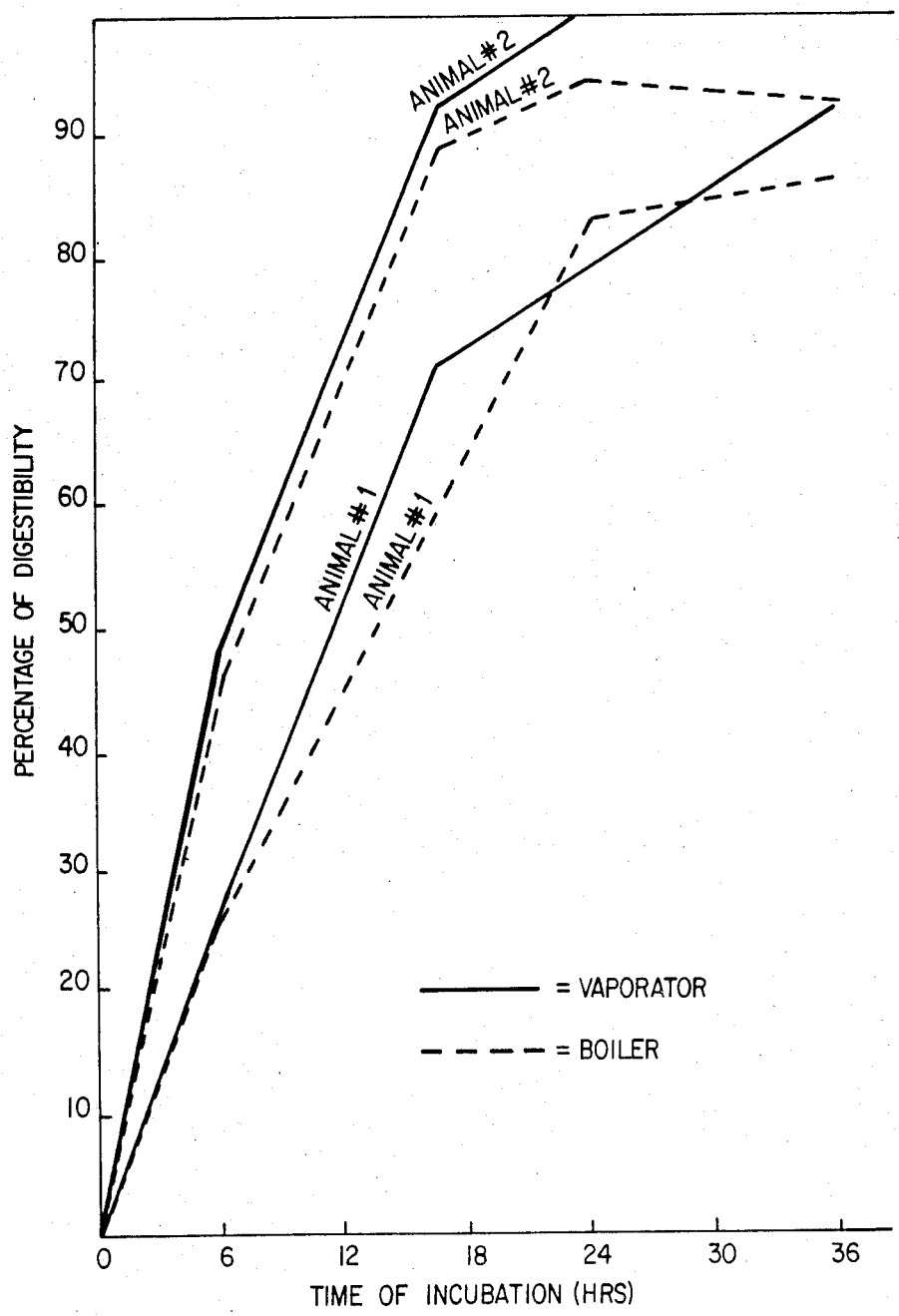
FIG. 7 is a line chart comparing the percentage of starch digestibility of grain conditioned in accordance with the principles of the present invention as set forth in FIG. 6C.

FIG. 7 addresses the percentage of starch digestibility between a first bovine (Animal I) of the Zebu variety (such as a Brahma) and a second bovine (Animal II) of an English bred variety (such as an Angus). The percentage of starch digestibility clearly varies between the two types of bovine but the percentage of starch digestibility for the bovine fed with grain processed in an anaerobic pasteurizing conditioning system constructed in accordance with the principles of the present invention shows a marked improvement over the identical grain processed by conventional boiler steam techniques. It may be seen that the percentage of starch digestibility at 17 hours was approximately 10% higher in Animal I and 4% higher in Animal II with grain anaerobically conditioned. Relative to Animal II, the percentage starch digestibility with anaerobically conditioned grain reached 100% before the 24 hour period (actual time lies between 18 and 24 hour points). The percentage starch digestibility went into a decline after said 24 hour period with conventionally conditioned grain, indicating starch or "enzymatic" reversal. It is to be pointed out that Animal II is the most typical breed of bovine utilized for table grade beef throughout the world and most typically found in feed lot conditions.

At the end of 6, 12 and 18 hours the percentage of starch digestibility for grain processed in accordance with the principles of the present invention was substantially more than with grain conventionally processed. This result is consistent with the data set forth in the chart of FIG. 6 and clearly indicates a marked advantage in the utilization of the present invention. As set forth above, starch digestibility is enhanced by processing the grain in an anaerobic environment utilizing direct fired steam in a counter flow conditioning system producing carbonic acid therein. This system clearly improves percentage starch digestibility which is a marked advantage over prior art systems and greatly enhances the nutritional value of the grain fed to bovine. As also set forth above, the stomach of bovine is anaerobic. Anaerobic digestion is typical of both humans, bovine, turkey, poultry and many other animals for which grain and other food stuff must be processed and/or conditioned.

Figure 8:
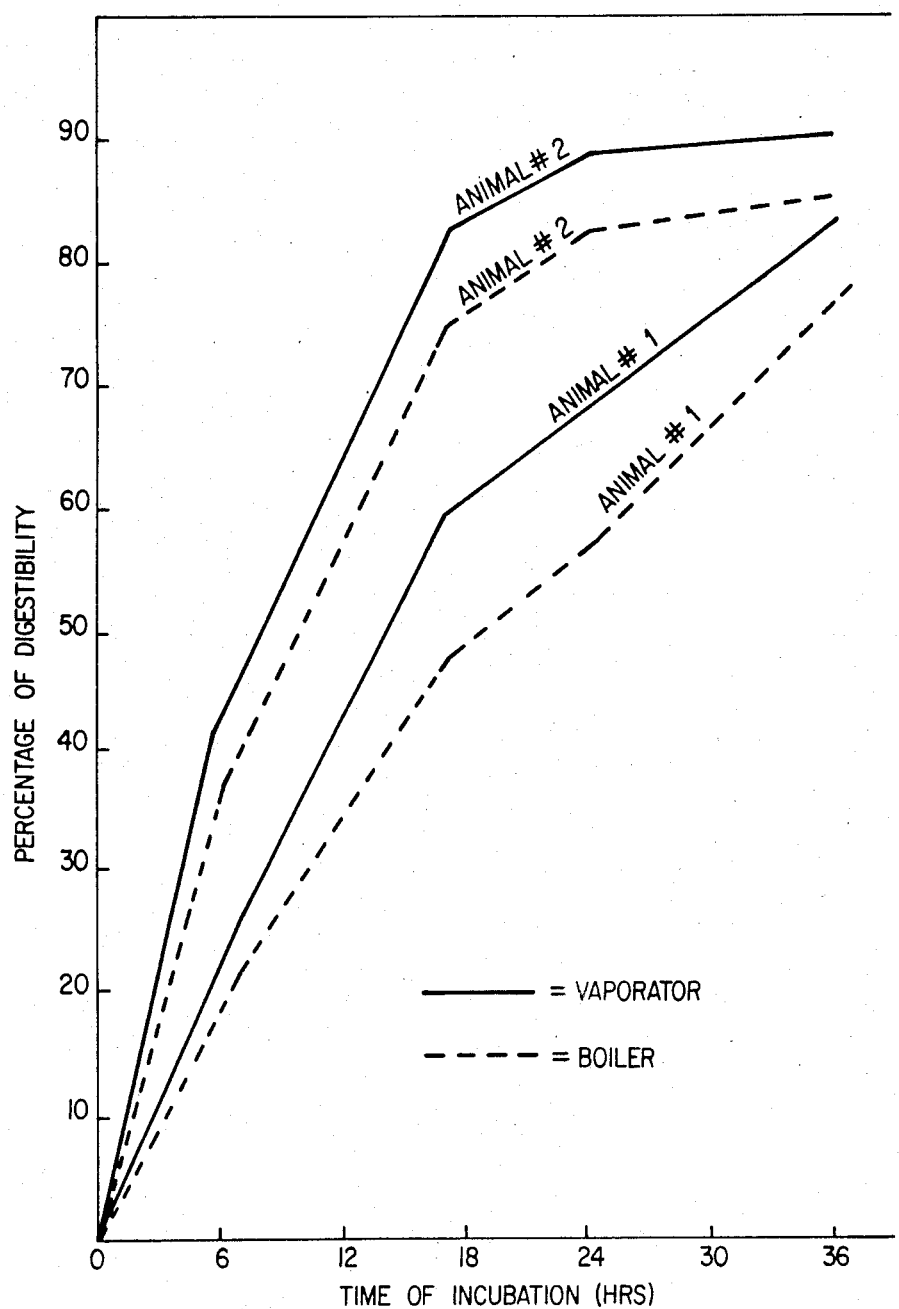
FIG. 8 is a line chart of percentage dry matter digestibility in the test of FIG. 6A.

Referring now to FIG. 8 there is shown a chart of percentage dry matter digestibility on an accumulated basis. Again Animal II excelled over Animal I and the utilization of the grain conditioning methods and apparatus of the present invention provided a substantially higher percentage of dry matter digestibility. At the end of 24 hours, grain conditioned in accordance with the principles of the present invention manifested around an 11% improvement in Animal I and around a 6% improvement in Animal II.

Figure 9:
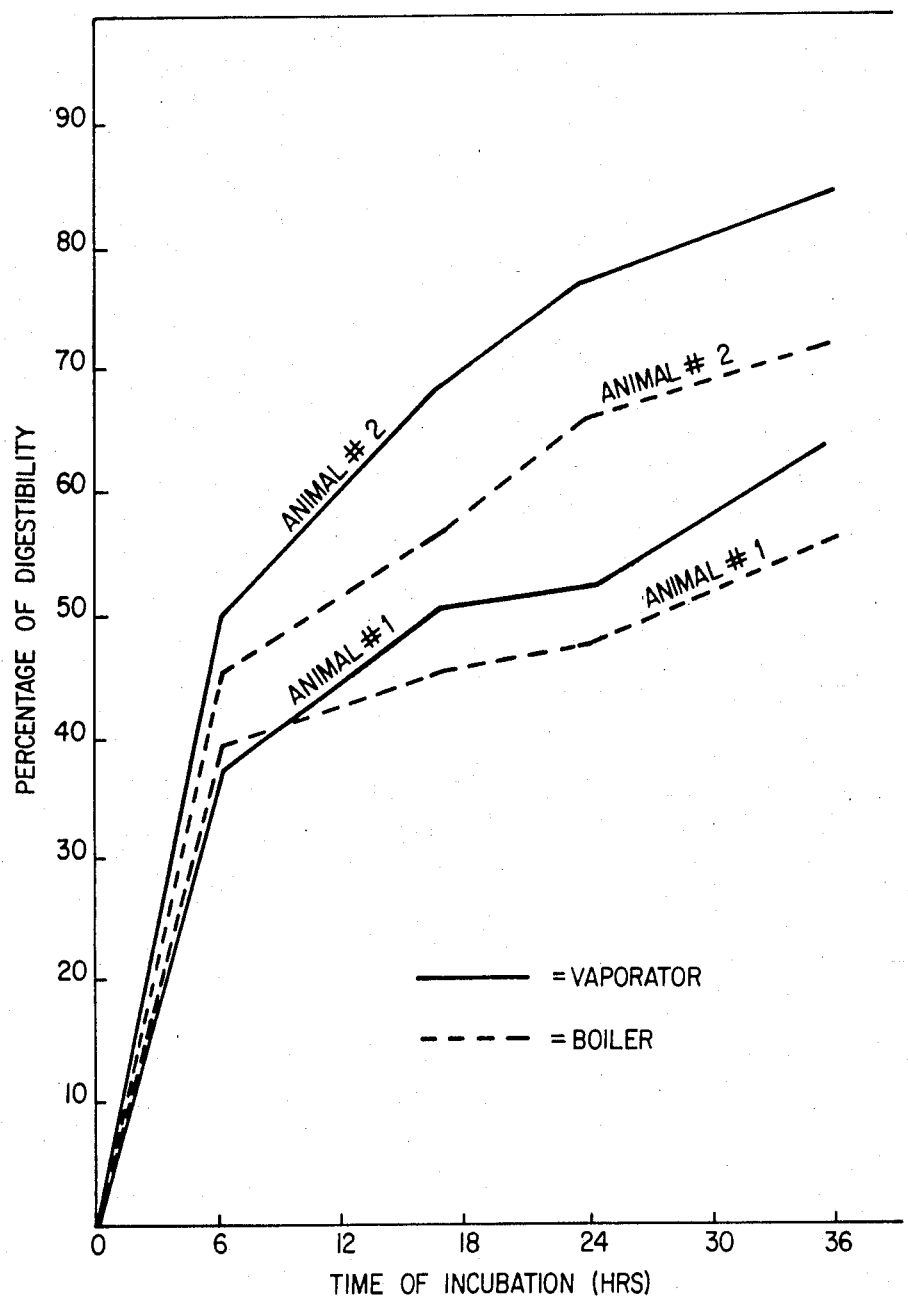
FIG. 9 is a line chart of percentage protein digestion in the test of FIG. 6B.

Referring now to FIG. 9 there is shown a line chart of the percentage protein digestion between the fustulated animals above described. The test data indicates the percentage digestibility of protein to be vastly improved by utilization of the principles of the present invention. At the end of 6 hours the percentage protein digestion for animal 2 processed in accordance with the principles of the present invention greatly exceeded the percentage protein digestion processed by prior art techniques. By the end of 24 hours the difference in percentage protein digestion between the two systems for animal 2 was over approximately 11%. Such data indicates a clear increase in nutritional value of anaerobic pasteurizing conditioning in accordance with the principles of the present invention and the previous graphic illustrations.

Still referring to FIG. 9, the data indicates that while the percentage protein digestion for Animal I was approximately the same for the first 10 hours, regardless of the system employed in the conditioning of the milo, protein digestion occurring thereafter showed a marked improvement with milo processed in accordance with the system 10 of the present invention and subsequently flaked (i.e. compressed) as heretofore described. Thus, the above data clearly indicates a new and improved animal feedstuff produced in accordance with the method utilized in conditioning feedstuff, such as grain, with the system 10 of the present invention, coupled with the subsequent compression of the conditioned grain.

Any suitable grain can be employed as the matter conditioned within the system 10 of the present invention. For example, typical of such grains are milo, wheat, oats, corn, barley and the like. Further, it is believed that the conditioning of the grains results in the starch components of the feedstuffs being gelatinized. The gelatinization of the starches within the grains, coupled with the moisture control feature imparted to the grains by the treatment of the grain in an anaerobic, heated environment in accordance with the system 10 results in improved shelf life for the grain and renders the conditioned grain more palatable and digestible to the animal. However, as previously indicated, in order to obtain the most benefit from the conditioned grain, the conditioned grain is subjected to the compression treatment, i.e., pelletizing, flaking and the like, so that the gelatinized starch components in the conditioned grain can be fractionated. This results in a foodstuff which is more palatable and digestible to the animal.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. An improved system for the conditioning of matter of the type wherein a vessel is adapted for the flow of matter therethrough and includes means for introducing a treatment fluid into said vessel, the improvement comprising:
   a direct fired steam generator for producing an anaerobic treatment fluid comprising steam and oxygen deficient non-condensible gases in the products of combustion;
   means for introducing the steam and oxygen deficient non-condensible gases from said generator into said vessel for counter-current flow relative to matter passing therethrough;
   at least one air lock disposed in said vessel for permitting the egress of matter having passed therethrough while preventing the exhaust of steam and gases therefrom; and
   means for controlling the operation of said direct fired steam generator to produce a sufficiently large volume of oxygen deficient gases and steam to purge the matter of other gases flowing therewith and create an anaerobic condition in said vessel.

2. The conditioning system as set forth in claim 1, wherein said direct fired steam generator further produces carbonic acid for reacting with said matter, causing breakdown therein, and rendering said matter conditioned therein more acidic.

3. The conditioning system as set forth in claim 2, wherein said matter is comprised of grain adapted for animal feed.

4. The conditioning system as set forth in claim 3, wherein said conditioning vessel is disposed in a generally vertical configuration and said means for introducing said steam and oxygen deficient non-condensible gases from said direct fired steam generator includes a diffuser disposed in a lower region of said generally vertically disposed vessel for discharging said steam and oxygen deficient non-condensible gases upwardly in counter current flow relative to matter passing therethrough.

5. The conditioning system as set forth in claim 4, wherein said means for controlling the operation of said direct fire steam generator includes means for determining the oxygen level of non-condensible gases produced by said direct fired steam generator and means for adjusting the combustion of said direct fire steam generator to produce oxygen deficient non-condensible gases.

6. The conditioning system as set forth in claim 5, wherein said oxygen deficient non-condensible gases contain on the order of 5% oxygen.

7. The conditioning system as set forth in claim 6, wherein said oxygen deficient non-condensible gases contain between 2% and 5% oxygen.

8. The conditioning system as set forth in claim 7 and further including a second air lock, disposed in said vessel for permitting the ingressing of matter therein while preventing the exhaust of steam therefrom.

9. The conditioning system as set forth in claim 8, which also includes means for permitting the controlled exhaust of non-condensible gases from said vessel comprising a venting orifice disposed in the region of said second air lock whereby said non-condensible gases are exhausted from said vessel after passing through said matter therein.

10. The conditioning system as set forth in claim 9, and further including means for mixing said matter passing through said vessel with said steam and oxygen deficient non-condensible gases for imparting a homogeneous interaction therebetween.

11. The conditioning sytem as set forth in claim 10, wherein said vessel comprises a generally vertically oriented tank adapted for receiving said matter at an upper end thereof, and discharging said matter from a lower region thereof and wherein said mixer means comprises a rotatable mounted mixer within said vessel, a plurality of paddle secured to said rotor and means for rotating said mixer to impart homogeneous mixing within said vessel.

12. An anaerobic, pasteurizing conditioning system of the type wherein a vessel is adapted for the flow of matter to be conditioned therethrough and means are provided for injection of a treatment fluid therein, said system comprising:
   a direct fired steam generator adapted for producing said treatment fluid comprising steam and non-condensible gases, said gases containing insufficient oxygen for sustaining aerobic baterial growth;
   means for adjusting the combustion of said direct fired steam generator to produce a sufficient large volume of oxygen deficient non-condensible gases and steam for purging said matter of other gases flowing therewith and maintaining the deficient oxygen level in the said non-condensible gases for creating an anaerobic condition in said vessel;
   means for introducing said steam and oxygen deficient non-condensible gases from said direct fired steam generator into said vessel for counter-current flow relative to matter passing therethrough; and
   means for permitting the exhaust of non-condensible gases from said vessel.

13. An anaerobic, pasteurizing conditioning system of the type wherein a vessel is adapted for the flow of matter to be conditioned therethrough and means are provided for injection of a treatment fluid therein, said system comprising:
   a direct fired steam generator adapted for producing said treatment fluid comprising steam and non-condensible gases, said gases containing insufficient oxygen for sustaining aerobic bacterial growth;
   means for introducing said steam and oxygen deficient non-condensible gases from said direct fired steam generator into said vessel for counter-current flow relative to matter passing therethrough;

means for permitting the exhaust of non-condensible gases from said vessel after said gases pass through said matter therein; and means for controlling the operation of said direct fired steam generator for producing a sufficiently large volume of oxygen deficient gases and steam for purging said matter of other gases flowing therewith and maintaining the deficient oxygen level in said non-condensible gases for creating an anaerobic condition in said vessel.

14. The conditioning system as set forth in claim 12 or 13 wherein said direct fired steam generator further produces carbonic acid for reacting with said matter, causing breakdown therein, and rendering said matter conditioned therein more acidic.

15. The conditioning system as set forth in claim 12 or 13 wherein said matter is comprised of grain adapted for animal feed.

16. The conditioning system as set forth in claim 12 or 13 wherein said conditioning vessel is disposed in a generally vertical configuration and said means for introducing said steam and oxygen deficient non-condensible gases from said vapor generator includes a diffuser disposed in a lower region of said generally vertically disposed vessel for dischaging said steam and oxygen deficient non-condensible gases upwardly in counter-current flow relative to matter passing therethrough.

17. The conditioning system as set forth in claim 12 or 13 wherein said means for controlling the operation of said direct fired steam generator includes means for determining the oxygen level of non-condensible gases produced by said direct fired steam generator and the means for adjusting the combustion of said direct fired steam generator to produce oxygen deficient non-condensible gases.

18. The conditioning system as set forth in claim 12 or 13 wherein said oxygen deficient non-condensible gases contain on the order of 5% oxygen.

19. The conditioning system as set forth in claim 12 or 13 wherein said oxygen deficient non-condensible gases contain between 2% and 5% oxygen.

20. The conditioning system as set forth in claim 12 or 13 further including an air lock, disposed in said vessel for permitting the ingressing of matter therein while preventing the exhaust of steam therefrom.

21. The conditioning system as set forth in claim 20 wherein said means for permitting the exhaust of non-condensible gases includes a venting orifice disposed in the region of said air lock whereby said non-condensible gases are exhausted from said vessel after passing through said matter therein.

22. The conditioning system as set forth in claim 12 or 13 and further including means for mixing said matter passing through said vessel with said steam and oxygen deficient non-condensible gases for imparting a homogeneous interaction therebetween.

23. The conditioning system as set forth in claim 22 wherein said vessel comprises a generally vertically oriented tank adapted for receiving said matter at an upper end thereof, and discharging said matter from a lower region thereof and wherein said mixer means comprises a rotatable mounted mixer within said vessel, a plurality of paddles secured to said rotor and means for rotating said mixer to impart homogeneous mixing within said vessel.

24. An improved method of conditioning matter wherein said matter is exposed to steam within a conditioning vessel, the improvement comprising the steps of:

producing steam and oxygen deficient non-condensible gaes with a direct fired vapor generator;

producing an anaerobic, oxygen deficient environment within said vessel by the introduction of said steam and non-condensible gases therein;

providing means for imparting a homogeneous interaction between said matter and said steam and non-condensible gases within said vessel;

providing said steam and non-condensible gases in sufficient volume and with sufficient enthalpy for substantially purging the system of all other oxygen laden gases for anaerobic pasteurization of matter passing therethrough; and issuing the anaerobically pasteurized matter from said vessel.

25. An improved method of conditioning matter wherein said matter is exposed to steam within a conditioning vessel, the improvement comprising the steps of:

producing steam and oxygen deficient non-condensible gases with a direct fired vapor generator;

adjusting the combustion conditions of said direct fired vapor generator to produce a selected value of oxygen deficient non-condensible gases;

introducing said steam and non-condensible gases into said vessel to produce an anaerobic, oxygen deficient environment within said vessel;

providing means for imparting a homogeneous interaction between said matter and said steam and non-condensible gases within said vessel; and providing said steam and non-condensible gases in sufficient volume and with sufficient enthalpy for substantially purging the system of all oxygen laden gases to produce anaerobic pasteurization of matter passing therethrough.

26. A product produced by the method of claim 24 or 25.

27. The method as set forth in claim 25 and further including:

determining the oxygen level value of non-condensible gases in the exhaust produced by said generator; and adjusting the combustion conditions of said direct fired vapor generator to produce a selected value of oxygen deficient non-condensible gases.

28. The method as set forth in claim 24 or 25 and further including the step of producing carbonic acid with said direct fired steam generator for rendering said matter conditioned therein more acidic.

29. The product produced by the method of claim 28.

30. The method as set forth in claim 24 or 25 wherein said matter is comprised of grain and further including the step of issuing said grain from said vessel and compressing said grain to fractionate gelatinized starch present in the grain resulting from the conditioning of the grain prior to storage and subsequent animal consumption.

31. The product produced by the method of claim 30.

32. The method as set forth in claim 24 or 25 including the step of disposing said conditioning vessel in a generally vertical configuration, providing a diffuser for introducing said steam and oxygen deficient non-condensible gases from said vapor generator into a lower region of said generally vertically disposed vessel, and discharging said steam and oxygen deficient non-condensible gases upwardly in counter-current flow relative to matter passing therethrough.

33. The product produced by the method of claim 32.

34. The method as set forth in claim 24 and further including the step of determining the oxygen level of non-condensible gases produced by said direct fired steam generator and adjusting the combustion conditions of said direct fired steam generator to produce a selected value of oxygen deficient non-condensible gases.

35. An improved system for conditioning matter of the type wherein said matter is exposed to steam and wherein the improvement comprises a conditioning vessel, a direct fired vapor generator, means for controlling said generator for producing an anaerobic, oxygen deficient exhaust comprising steam and non-condensible gases, means for adjusting the combustion of said generator for producing oxygen deficient non-condensible gases in said exhaust, means for injecting said anaerobic, oxygen deficient exhaust into said vessel, means for imparting a homogeneous interaction between said matter and said exhaust within said vessel, means for providing said exhaust in a sufficient volume and with sufficient enthalpy for purging said vessel of substantially all gases to produce anaerobic pasteurization of said matter passing therethrough.

36. An improved system for conditioning matter of the type wherein said matter is exposed to steam and wherein the improvement comprises a conditioning vessel, a direct fired vapor generator, means for controlling said generator for producing an anaerobic, oxygen deficient exhaust comprising steam and non-condensible gases, means for injecting said anaerobic, oxygen deficient exhaust into said vessel, means for imparting a homogeneous interaction between said matter and said exhaust within said vessel, means for providing said exhaust in a sufficient volume and with sufficient enthalpy for purging said vessel of substantially all gases, other than said exhaust, and means for controlling the enthalpy, partial pressure, and dew point within said vessel for selectively exposing said matter to preselected temperature, moisture and oxygen levels and thereby conditioning said matter.

37. The conditioning system as set forth in claim 35 or 36 wherein said direct fired steam generator further produces carbonic acid for reacting with said matter, causing breakdown therein, and rendering said matter conditioned therein more acidic.

38. The conditioning system as set forth in claim 35 or 36 wherein said matter is comprised of grain adapted for animal feed.

39. The conditioning system as set forth in claim 35 or 36 wherein said conditioning vessel is disposed in a generally vertical configuration and said means for injecting said steam and oxygen deficient non-condensible gases from said vapor generator includes a diffuser disposed in a lower region of said generally vertically disposed vessel for discharging said steam and oxygen deficient non-condensible gases upwardly in counter-current flow relative to matter passing therethrough.

40. The conditioning system as set forth in claim 35 wherein said means for controlling the operation of said direct fired vapor generator includes means for determining the oxygen level of non-condensible gases produced by said direct fired vapor generator and the means for adjusting the combustion of said direct fired steam generator to produce oxygen deficient non-condensible gases.

41. The conditioning system as set forth in claim 35 or 36 wherein said oxygen deficient non-condensible gases contain on the order of 5% oxygen.

42. The conditioning system as set forth in claim 35 or 36 wherein said oxygen deficient non-condensible gases contain between 2% and 5% oxygen.

43. The conditioning system as set forth in claim 35 or 36 and further including means for mixing said matter passing through said vessel with said steam and oxygen deficient non-condensible gases for imparting a homogeneous interaction therebetween.

44. The conditioning system as set forth in claim 43 wherein said vessel comprises a generally vertically oriented tank adapted for receiving said matter at an upper end thereof, and discharging said matter from a lower region thereof and wherein said mixer means comprises a rotatably mounted mixer within said vessel, a plurality of paddle secured to said rotor and means for rotating said mixer to impart homogenous mixing within said vessel.

* * * * *

Disclaimer 4,731,938.—*Richard L. White*, Dallas, Tex. ANAEROBIC PASTEURIZING CONDITIONING SYSTEM. Patent dated Mar. 22, 1988. Disclaimer filed Mar. 12, 1990, by the assignee, VE Holding Corp.

The term of this patent subsequent to May 25, 2004, has been disclaimed.
[ *Official Gazette April 30, 1991* ]